July 11, 1967    G. E. GREY ET AL    3,330,424
BALE WAGON CONTROL
Filed April 8, 1965    3 Sheets-Sheet 1

INVENTORS
Gordon E. Grey +
BY  William W. Wilson

Joseph A. Brown
ATTORNEY

INVENTORS
Gordon E. Grey +
BY William W. Wilson

ATTORNEY

July 11, 1967   G. E. GREY ET AL   3,330,424
BALE WAGON CONTROL
Filed April 6, 1965   3 Sheets-Sheet 3
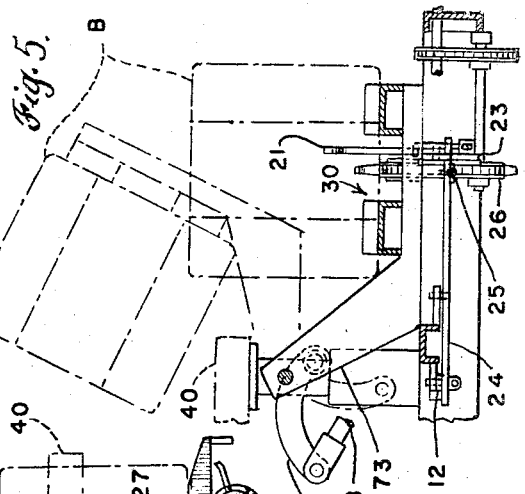
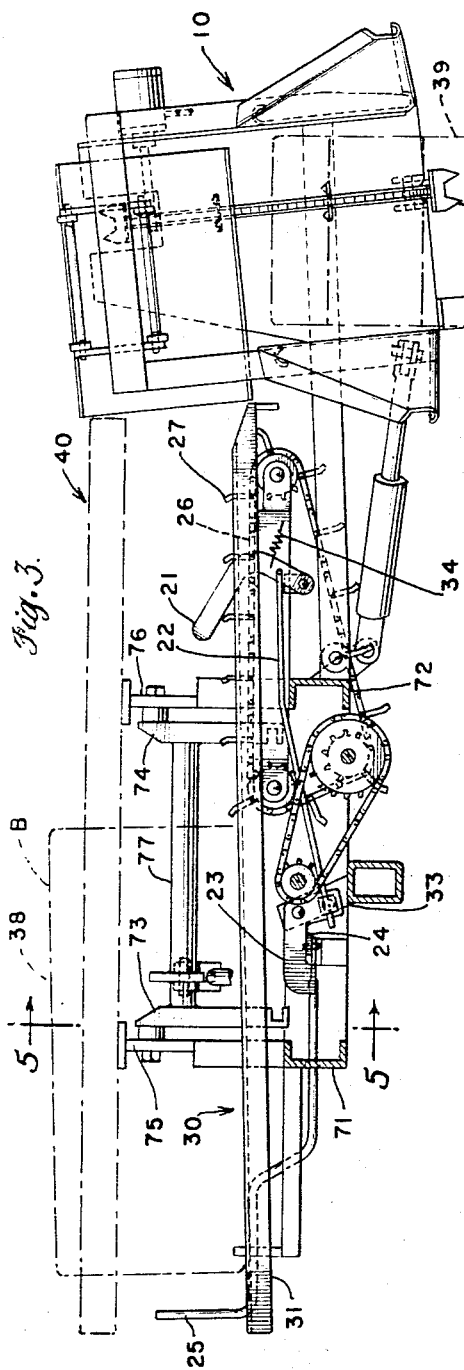
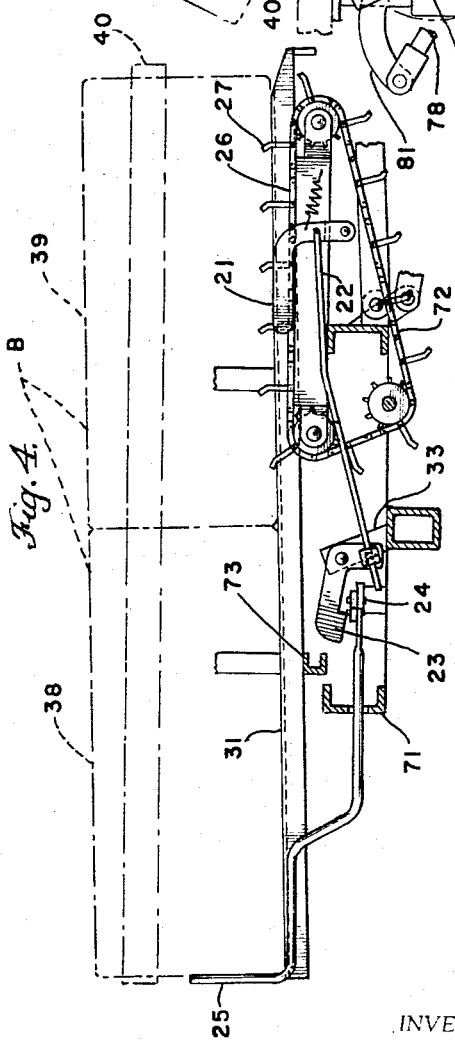
INVENTORS
Gordon E. Grey +
BY  William W. Wilson
Joseph A. Brown
ATTORNEY

United States Patent Office 3,330,424
Patented July 11, 1967

3,330,424
BALE WAGON CONTROL
Gordon E. Grey, Kingsburg, and William W. Wilson, Selma, Calif., assignors to Sperry Rand Corporation, New Holland, Pa., a corporation of Delaware
Filed Apr. 6, 1965, Ser. No. 446,052
9 Claims. (Cl. 214—6)

ABSTRACT OF THE DISCLOSURE

An automatic bale wagon having a receiving bed with a trip for actuating the bed unloading mechanism and a control to prevent actuation of the trip, except when the bed is fully loaded.

---

This invention relates to bale wagons or vehicles intended to handle baled products such as baled hay. More particularly, the invention relates to improvements in a trip mechanism for a receiving bed on a bale wagon as disclosed in U.S. Patent No. 2,848,127.

The bale wagon disclosed in the patent noted above is provided with a wheel supported maneuverable chassis adapted to travel forwardly along a series of bales, a bale loader mounted on the forward end of the chassis, a pivotally mounted receiving bed adjacent the bale loader, a pivotally mounted transfer bed rearwardly of the receiving bed and a pivotally mounted load-carrying bed rearwardly of the transfer bed. Bales are loaded onto the receiving bed which elevates them onto the transfer bed, two bales at a time. When the transfer bed accumulates a layer of bales, it pivots upwardly to deposite a vertical stack of bales on the load-carrying bed. Bale actuated trip means are provided to actuate the elevating means on both the receiving bed and the transfer bed.

The receiving bed trip mechanism on the patented device is located on an end portion of the receiving bed opposite the bale loader and is designed to operate when two bales have been correctly positioned on the receiving bed. A first bale loaded on the receiving bed will be moved laterally toward the trip, but will not be moved against the trip by the conveyor. When a second bale is loaded on the receiving bed, it is conveyed against the first bale whereupon both bales are moved laterally and the first bale is moved into contact with the trip mechanism.

When the bales being handled are made of slick material, they have a tendency to slide easily. It sometimes happens that when the wagon conveyor moves a first bale laterally on the receiving bed and discharges the bale short of the trip, the bale slides the remaining distance and strikes the trip with enough force to actuate the mechanism. Also it has been found that the trip mechanism described above works best when the hay field is reasonably smooth and level. Where the fields are rough, or the terrain is hilly, the first bale may slide or be jolted laterally against the trip before the second bale has been loaded. If this occurs, the receiving bed is elevated with only one bale, and the transfer bed will be unevenly filled. The operator must then stop and manually place a second bale on the transfer bed.

Accordingly, it is one object of this invention to provide a bale wagon with a receiving bed transfer mechanism which will not function until bales on the bed have reached a predetermined position.

Another object of this invention is to provide a bale wagon with elevating means which will not function until at least two bales have been received on the bed.

Another object of this invention is to provide a bale wagon with a receiving bed trip mechanism which will not function until the receiving bed has been filled.

Another object of this invention is to provide a bale wagon with a safe receiving bed trip mechanism which cannot be inadvertently tripped by an operator while making repairs on the bale wagon.

Another object of this invention is to provide a bale wagon with a receiving bed trip mechanism which is non-operative when the receiving bed is not filled with bales, and automatically becomes operative when the bed is full.

A further object of this invention is to provide a bale wagon with a receiving bed trip mechanism which is relatively simple, low cost, rugged and requires no maintenance.

A still further object of this invention is to provide a bale wagon with control means for the receiving bed trip mechanism.

Other objects of this invention will be apparent hereinafter from the specification and from the recital in the appended claims.

In the drawings:

FIG. 3 is a side elevational view of the receiving bed showing a first bale on the receiving bed and the trip mechanism locked in a non-operative position.

FIG. 4 is a side elevational view showing a first bale engaging the trip rod and a second bale engaging and depressing the finger of the trip control means so that the trip mechanism is operative.

FIG. 5 is a section on the line 5—5 of FIG. 3 showing the receiving bed in its load receiving position, and a dot-and-dash indication of the bed in an elevated position just prior to placing bales on the transfer bed.

Figure 1:
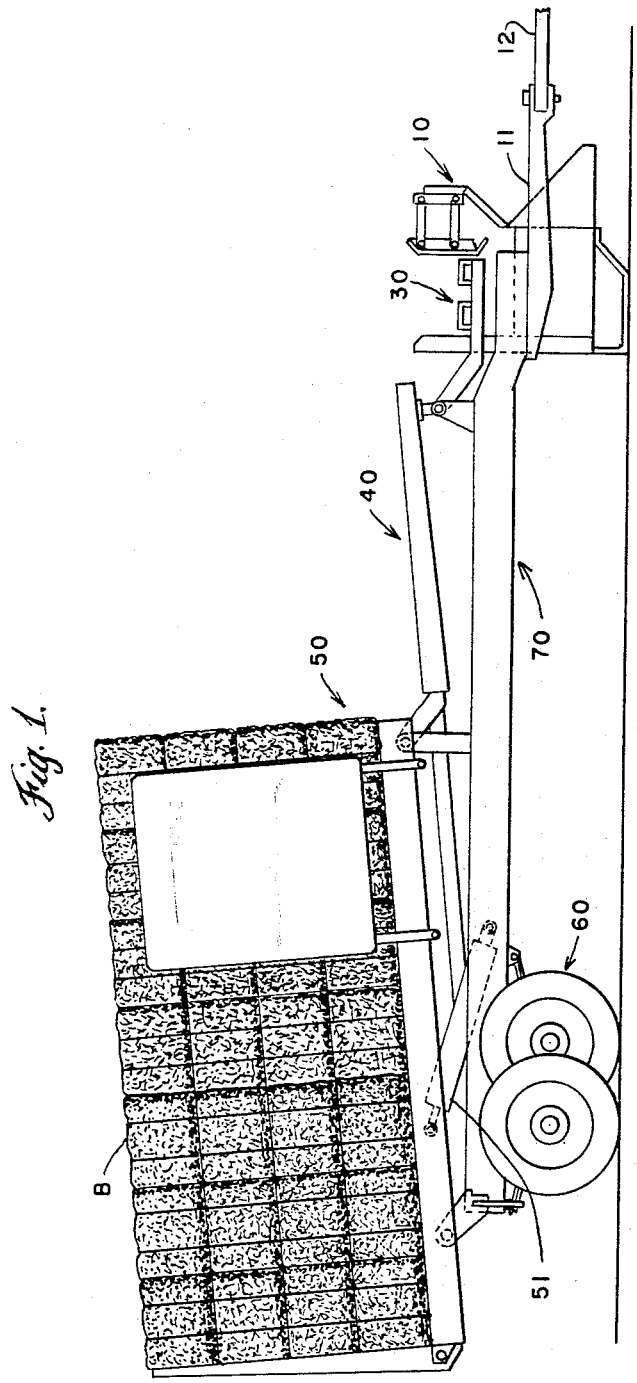
FIG. 1 is a side view showing the bale wagon and the general arrangement of the main components.

Referring now to the drawings by numerals of reference, the bale wagon of this invention is shown generally in FIG. 1. The wagon comprises a chassis 70, a bale loader 10 mounted on one side of the chassis forward end portion, a receiving bed 30 adjacent the bale loader, a transfer bed 40 pivotally mounted behind the receiving bed, a load-carrying bed 50 on the rear end of the chassis and a suspension system 60. The forward end of the chassis is provided with a hitch bar 11 connected to a tractor drawbar 12, shown fragmentarily.

With reference to FIGS. 2–5, the receiving bed 30 comprises a pair of transfer floor elements 31, 32 which are mounted on downwardly and forwardly extending frame elements 73, 74. The two frame elements are joined by cross bar 77. The receiving bed is pivotally connected to mounting brackets 75 and 76 on the wagon chassis.

The tilting means for the receiving bed comprises a conventional fluid actuated piston and cylinder arrangement for lifting the bed. Cylinder 79 is mounted to the wagon chassis, and piston 71 is pinned to link 81 on bar 77. Fluid to cylinder 79 is regulated by valve 29 (see FIG. 2). The valve 29 is operatively connected to lever 24 which opens and closes the valve in response to movements of the trip mechanism. Lever 24 is pivotally connected in a medial portion to chassis element 28. A spring 36 serves to bias the lever in a normal non-operative position.

The trip mechanism comprises a trip rod 25 which is pinned to lever 24. The trip rod extends under the receiving bed through chassis frame member 71 and is then offset upwardly through V-shaped guide bracket 35. A transverse end portion of the trip rod extends upward between the bed floor elements. The trip rod is movable from a first position within the perimeter of the receiving bed, as shown in FIG. 3, to a second position shown in FIG. 4.

Figure 2:
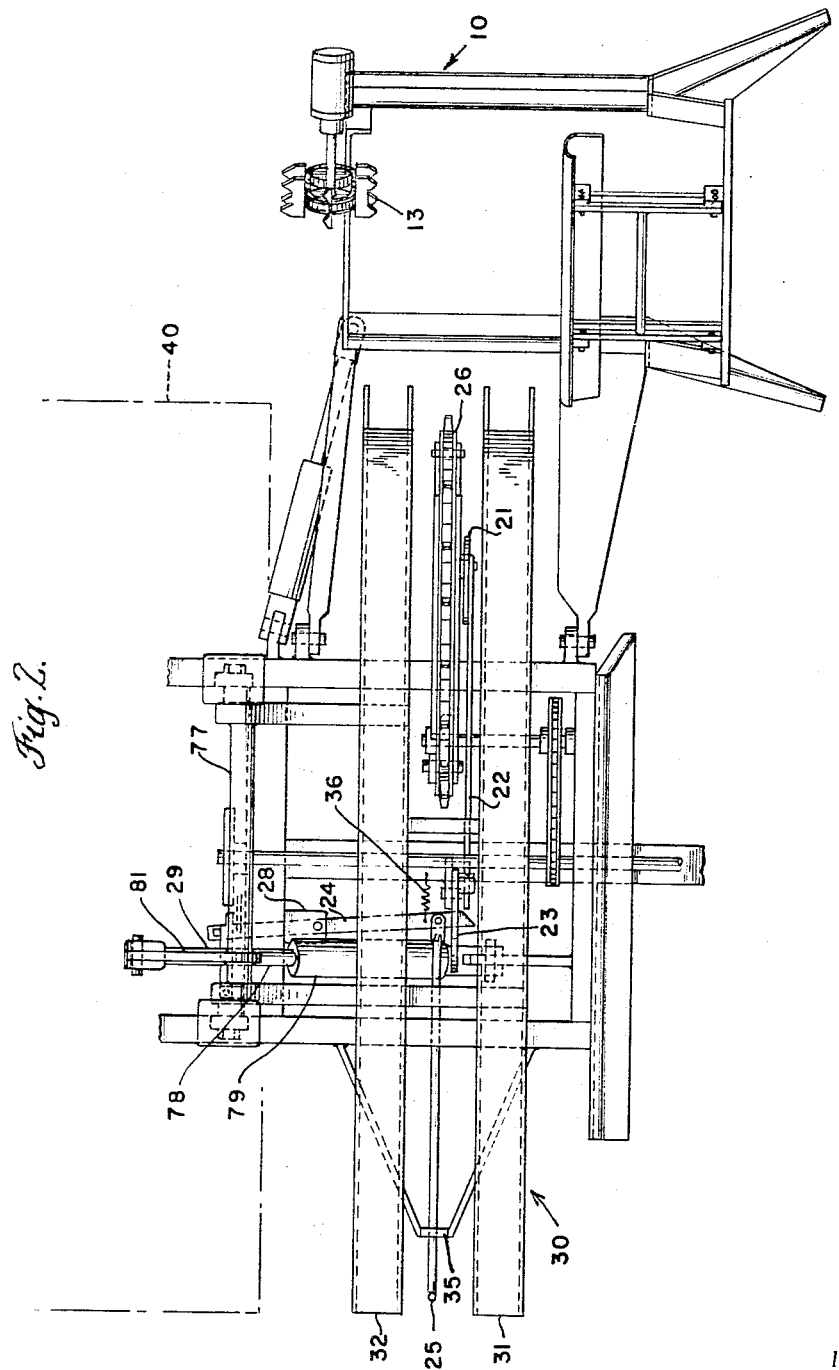
FIG. 2 is a plan view of the bale loader and the receiving bed showing the conveyor chain, trip mechanism, and tilting means for the receiving bed.

The trip control means, as best shown in FIGS. 2–4, consists of an L-shaped finger 21 pivotally mounted to the wagon chassis, latch 23 pivotally mounted to chassis element 33, and an angled connecting rod 22 which operatively links finger 21 to latch 23. It will be noted that rod 22 is so connected to finger 21 and latch 23 that downward pivotal movement of the finger will result in upward pivotal movement of the latch. Spring 34 serves to bias the trip control means to a normal operative position, as shown in FIG. 3. In its normal position, finger 21 extends upward adjacent conveyor chain 26 and above chain lugs 27. Latch 23 is substantially L-shaped with one leg having a curved end portion which is adapted to extend over lever 24 to lock it in a non-operative position; the other leg of the latch is connected to rod 22. The trip control means is moved from its normal operative position (see FIG. 4) when engaged by bales B on the receiving bed.

Operation of the bale wagon and trip mechanism is as follows:

Bales B are picked up from the field by bale loader 10 and deposited on the receiving bed 30. A first bale 38 is moved by the conveyor chain 26 to substantially the position shown in FIG. 3 where it is spaced from trip rod 25. If the hay field is particularly rough or slippery material is being baled, the first bale may slide or be jolted against the trip rod 25. In the event this happens, however, the trip rod will not actuate the tilting means since lever 24 is locked in place by latch 23 of the trip control means. When a second bale 39 is loaded on the receiving bed, it is moved into abutting relationship with the first bale whereupon the conveyor moves both bales laterally and the first bale is pushed against trip rod 25. With both bales on the receiving bed (see FIG. 4) the trip rod will operate the tilting means, since the second bale serves to move the trip control means to a non-operative position by pivoting finger 21 down and thereby moving latch 23 out of engagement with lever 24. When the tilting means is actuated, the two bales are deposited on the transfer bed 40, as shown in FIG. 5. This operation is repeated until the transfer bed has accumulated a layer of bales, two bales across and four bales in length. The transfer bed is then pivoted upwardly to deposit the bales on the load-carrying bed 50 and form a vertical stack of bales thereon. This operation continues until the load carrying bed is filled, as shown in FIG. 1. The load carrying bed is adapted to mechanically deposit the entire load on the ground by fluid actuated means 51, shown in FIG. 1.

It will be seen from the above description that an efficient means is provided by this invention for insuring that the receiving bed trip mechanism cannot be actuated unless the bed is fully loaded with bales. An additional feature of this invention is that the trip is locked in place when the bed is empty. Thus, if an operator should inadvertently hit the trip while making a minor repair in the field, he will not be injured by the receiving bed.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A bale wagon comprising a wheel supported maneuverable chassis adapted to travel forwardly along a series of bales lying on the ground in spaced relation to each other, a bale loader mounted on the forward end of said chassis adapted to be guided into registry with said series of bales, a receiving bed mounted on said chassis adapted to receive a row of bales from said bale loader, said receiving bed extending transversely at least the length of two bales, a transfer bed disposed rearwardly of said receiving bed and arranged to accept rows of bales from said receiving bed to form a layer thereof, a load-carrying bed adapted to receive a series of upright layers of bales from said transfer bed to form a multiple bale stack, conveyor means on said chassis for moving said bales on said receiving bed laterally, said conveyor means extending along one end portion of said bed and said one end portion being adjacent said bale loader, tilting means for pivoting said receiving bed upwardly to dispose rows of bales on said transfer bed, bale actuated trip means on said chassis for actuating said tilting means, said trip means being adjacent an end portion of said bed opposite said one end portion, said trip means comprising a vertically extending trip rod, bale actuated control means on said chassis for locking said trip means in a non-operative position until there are a plural number of bales on said receiving bed, said control means comprising a finger extending upwardly from said receiving bed and being located more than one bale length from said trip rod, said conveyor means being adapted to receive a first bale from said loader and move it along said bed toward said trip rod but spaced therefrom, said conveyor means then receiving a second bale and moving said second bale into an abutting relationship with said first bale whereby said first bale is forced against said trip rod while said second bale contacts said finger so that said tilting means is actuated for depositing said bales onto said transfer bed.

2. A bale wagon, as recited in claim 1, wherein said finger is pivotally connected to said chassis adjacent to said conveyor means and extends above said bed and conveyor means, a latch element is pivotally attached to said chassis and adapted to engage said tilting means, and an angled rod connects said latch element to said finger.

3. A bale wagon, as recited in claim 1, wherein said receiving bed comprises a pair of forwardly extending arms pivotally mounted to said chassis, and a pair of parallel laterally extending floor elements spaced apart on said arms.

4. A bale wagon, as recited in claim 1, wherein said conveyor means comprises an endless conveyor chain, and lugs on said chain which extend above said bed for moving bales laterally along the receiving bed.

5. A bale wagon, as recited in claim 1, wherein said tilting means comprises lifting means and operating means for actuating said lifting means, said trip means is connected to said operating means, said control means releasably engages said operating means, whereby said trip means actuates said operating means when both said trip means and said control means are engaged by bales on said receiving bed.

6. A bale wagon, as recited in claim 5, wherein said operating means comprises a valve and a lever pivotally mounted intermediate its ends to said chassis, said lever being connected to said valve on one end and to said trip means on an opposite end.

7. A bale wagon, as recited in claim 5, wherein said lifting means comprises a cylinder and a fluid actuated piston, said valve controlling the flow of fluid to said cylinder for driving said piston.

8. A receiving bed on a bale wagon having a wheel suported maneuverable chassis adapted to travel forwardly along a series of bales lying on the ground in spaced relation to each other comprising a pair of frame elements pivotally mounted on said chassis, a pair of spaced transverse floor elements supported by said frame elements, means on said chassis for pivoting said receiving bed to a vertical position, a lever pivotally mounted to said chassis for actuating said means, said lever being movable from a first position where said means is inoperative to a second position where said means is operative, a trip rod having one end connected to said lever and an opposite end adjacent one end portion of said bed, said opposite end extending upward between and above said floor elements, a finger pivotally attached to said chassis which in one position extends upward between and above said floor elements on an end portion of said bed opposite said one end portion the finger being pivotal downwardly toward the bed to another position, said finger being spring-biased to said one position, a latch element pivotally mounted to said chassis and movable from a down position where said latch locks said lever in said first position to an up position where said latch is out of engagement with said lever, means linking said finger to said latch element so that pivotal movement of said finger to said other position will move said latch to said up position and said lever will then move from said first to said second position when a laterally outward force is applied to said trip rod.

9. A bale wagon comprising a wheel supported maneuverable chassis, a receiving bed on said chassis adapted to receive a plural number of bales of a given length at one end thereof, lifting means on said wagon for elevating said bales on said bed, trip means on said wagon for actuating said lifting means, said trip means comprising a trip rod adjacent an end of said receiving bed opposite said one end, conveyor means on said wagon adjacent said one end of the receiving bed for moving bales received at said one end laterally on said bed, said conveyor means extending along said one end and terminating at a point more than one bale length from said trip rod, control means on said wagon and operatively connected to said trip means for preventing actuation of said lifting means by said trip means until said bed has been fully loaded, said control means comprising a finger mounted adjacent said conveying means and extending above said bed for contacting a bale being moved over said bed by said conveying means, said control means being non-operative when said finger is in contact with a bale on said bed, and said finger being spaced more than one bale length from said trip rod and less than one bale length from said one end so that said finger and said rod cannot be engaged simultaneously until the receiving bed has been fully loaded.

References Cited

UNITED STATES PATENTS

| 2,822,659 | 2/1958 | Moore | 214—6 |
| 2,848,127 | 8/1958 | Grey | 214—510 |
| 3,193,079 | 7/1965 | Winter et al. | 198—31 |

FOREIGN PATENTS 641,978  2/1937  Germany.

OTHER REFERENCES

"Automatic Bale Wagons," New Holland Machine Co., Form No. 9124, copyrighted November 1962.

GERALD M. FORLENZA, *Primary Examiner.*

J. E. OLDS, *Assistant Examiner.*